(No Model.)
J. DOYLE.
LATHE DOG.
No. 245,943. Patented Aug. 23, 1881.
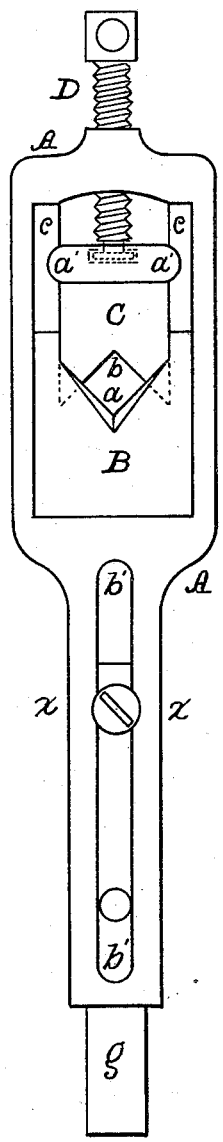
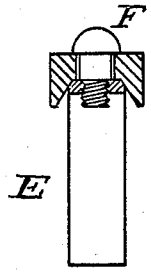
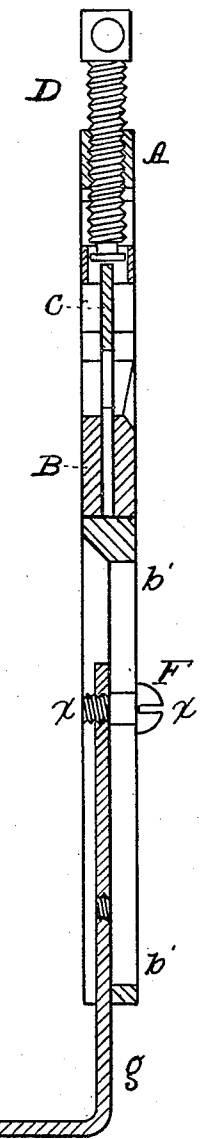
Witnesses
Robert W. Matthews
Chas. H. Doxat
Inventor
John Doyle
per James A Whitney
Attorney

UNITED STATES PATENT OFFICE.

JOHN DOYLE, OF HOBOKEN, NEW JERSEY, ASSIGNOR OF ONE-HALF TO C. COLES DUSENBURY, OF WHITE PLAINS, NEW YORK.

LATHE-DOG.

SPECIFICATION forming part of Letters Patent No. 245,943, dated August 23, 1881.

Application filed December 24, 1880. (No model.)

*To all whom it may concern:*

Be it known that I, JOHN DOYLE, of Hoboken, in the county of Hudson and State of New Jersey, have invented a new and useful Improvement in Lathe-Dogs, of which the following is a specification.

This invention comprises a lathe-dog of novel construction, whereby shafting-spindles and other articles may be more securely held in the lathe for turning than is ordinarily practicable with other devices designed for similar uses, and whereby, further, a single implement is enabled to do the work of a number of implements of different sizes, as has hitherto been necessary.

Figure 1 is a front view; Fig. 2, a longitudinal sectional view, taken in a plane at right angles to Fig. 1; and Fig. 3 is a cross-section, in the line $x\,x$ of Figs. 1 and 2, of a lathe-dog made according to my invention.

A is the frame or body of the dog, in the large central opening of which is fitted a block, B, in the innermost end of which is formed a large triangular notch, $a$. This block is deeply recessed in the middle, in a plane parallel with the flat sides thereof, in order to permit the movable block C to move inward and outward to and from the interior of the block B. This block C has its innermost end notched, as shown at $b$, the said notch $b$ being coincident with the notch $a$ of the other block, B, as indicated in Fig 1. The block C is of such thickness as to move into the deep recess, hereinbefore described, of the block B, and is fitted between lateral guides $e$, formed in the adjacent edge portions of the frame A, lugs $a'$ being provided at each side of the block C, so as to project laterally in opposite directions, and thereby extend upon the guides $e$ to retain the upper part of the block C in position, while the lower part thereof is retained in place by projecting into the space or interior of the block B, as just explained. It will be observed, therefore, that the block C can move inward and outward to and from the block B, and that the opening formed by the coincident notches $a\,b$ will be increased or diminished, according as the block C is moved inward or outward. This adjustment of the block C is secured by means of a screw, D, which works through a nut in the adjacent end of the frame A. The opposite end of said frame A is slotted from front to rear, the said slot being beveled or notched at its rear side to form a guide for the reception of the shank $g$ of the arm E, the said shank $g$ being moved in or out, according as it is desired to have the arm E at a greater or less distance from the opening formed by the notches $a\,b$, the said shank being fixed at any requisite position by means of a set-screw, F, the enlarged head of which bears against the front of the frame A at the edges of the slot aforesaid, the said screw itself being screwed into a suitable nut formed in the shank, so that by turning the screw the shank will be bound fast in the guides aforesaid, with the arm E projecting at right angles to the adjacent rear face or side of the frame A.

It will be observed that inasmuch as the opening formed by the adjustment of the notches $a\,b$ of the blocks B C may be varied at will, the dog is adapted to receive shafting-spindles or the like on widely-turning diameters, and that the arm E, being adjustable at a greater or less distance from the aforesaid opening, may be adjusted to any requisite degree in relation with the slots of the face-plate of the lathe. The improved lathe-dog, provided with the combination of parts hereinbefore just described, is by this means adapted for use in the turning of all articles having a range of diameter hithereto necessitating the use of several dogs of the ordinary kind, according as the diameter of the article to be turned is greater or less.

It is to be observed that the block B may, when desired, be made in one piece with the frame A, and that the block C may be confined within its guides by means other than the lugs, as herein described.

In practice my said improved lathe-dog may be most conveniently made by having its frame, together with the block B, formed of two sections separately cast and then bolted or otherwise secured together, the line of division between said sections being centrally between the opposite broad or flat face of the frame A.

What I claim as my invention is—

The frame A, constructed with the slot $b'$, the notched blocks B C, the screw D, the arm E, having its shank placed in the slot $b'$, and the set-screw F, the whole combined and arranged for joint use and operation substantially as and for the purposes herein set forth.

JOHN DOYLE.

Witnesses:
CHAS. H. DOXAT,
ROBERT W. MATTHEWS.